No. 11,879. Reissued Jan. 1, 1901.

S. P. MacCORDY.

BUTTON DRILLING MACHINE.

(Application filed Nov. 7, 1900.)

3 Sheets—Sheet 1.

WITNESSES:
A. E. Hopkins.
W. Ingersoll

INVENTOR,
Samuel P. MacCordy,
BY
Mark W. Dewey,
his ATTORNEY.

No. 11,879. Reissued Jan. 1, 1901.

S. P. MacCORDY.

BUTTON DRILLING MACHINE.

(Application filed Nov. 7, 1900.)

3 Sheets—Sheet 2.

WITNESSES:

A. E. Hopkins.

W Ingerson

INVENTOR,

Samuel P. MacCordy

BY

Mark W. Dewey his ATTORNEY.

No. 11,879. Reissued Jan. 1, 1901.

S. P. MacCORDY.

BUTTON DRILLING MACHINE.

(Application filed Nov. 7, 1900.)

3 Sheets—Sheet 3.

WITNESSES:
A. E. Hopkins.
W Ingerson

INVENTOR,
Samuel P. MacCordy,
BY
Mark W. Dewey,
his ATTORNEY.

UNITED STATES PATENT OFFICE.

SAMUEL P. MACCORDY, OF AMSTERDAM, NEW YORK, ASSIGNOR TO THE MACCORDY BUTTON MACHINE COMPANY, OF NEW YORK.

BUTTON-DRILLING MACHINE.

SPECIFICATION forming part of Reissued Letters Patent No. 11,879, dated January 1, 1901.

Original No. 646,647, dated April 3, 1900. Application for reissue filed November 7, 1900. Serial No. 35,774.

*To all whom it may concern:*

Be it known that I, SAMUEL P. MACCORDY, of Amsterdam, in the county of Montgomery, in the State of New York, have invented new and useful Improvements in Button-Drilling Machines, of which the following, taken in connection with the accompanying drawings, is a full, clear, and exact description.

My invention relates to button-drilling machines; and the object is to provide a simple machine of this class that will operate on one or several buttons simultaneously, drill the holes in each successively, and automatically carry one or more other buttons to the drill or drills and release the buttons after they are drilled, thus saving time and labor.

To this end my invention consists in the combination, with a rotary reciprocating drill-spindle, of a rotary drum carrying several chucks for buttons and having its axis at right angles to the drill-spindle, means to automatically move the said drum vertically and horizontally, means to rotate the drum intermittently, and a locking device to hold the drum stationary during the drilling operation; and my invention consists in certain other combinations of parts hereinafter described, and specifically set forth in the claims.

Figure 1:
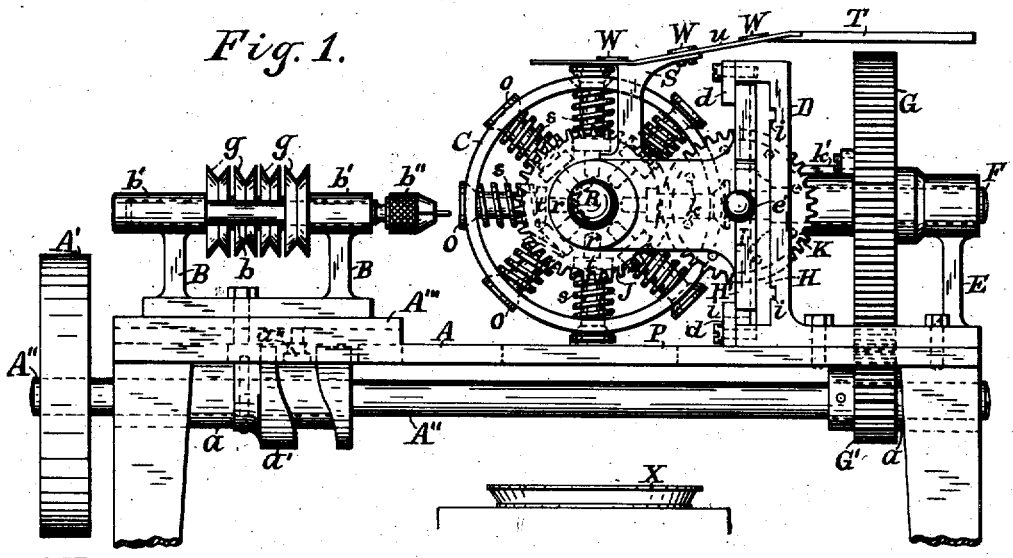
Figure 2:
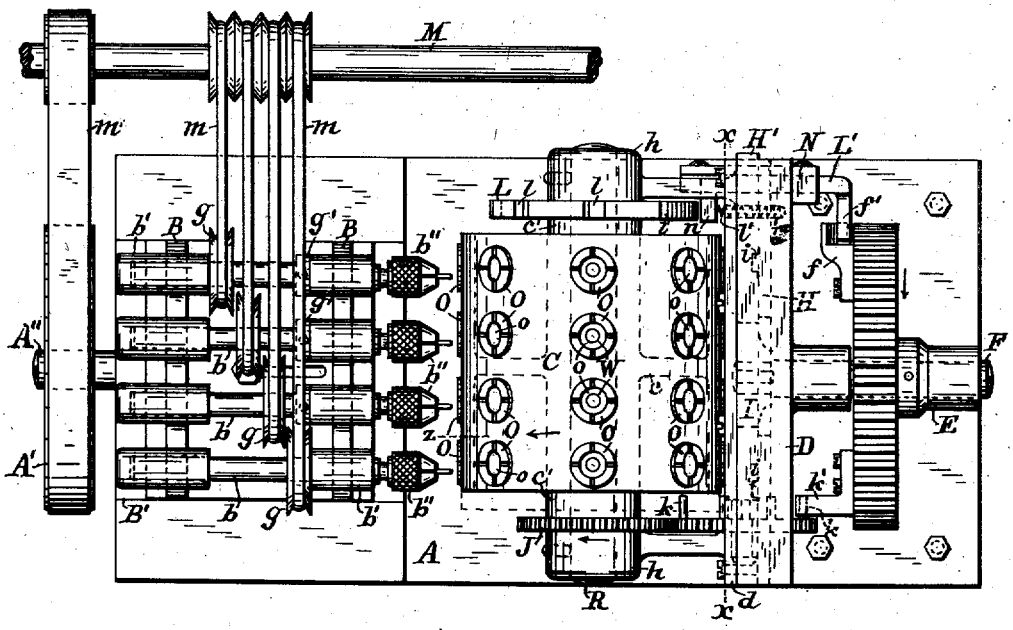
Figure 3:
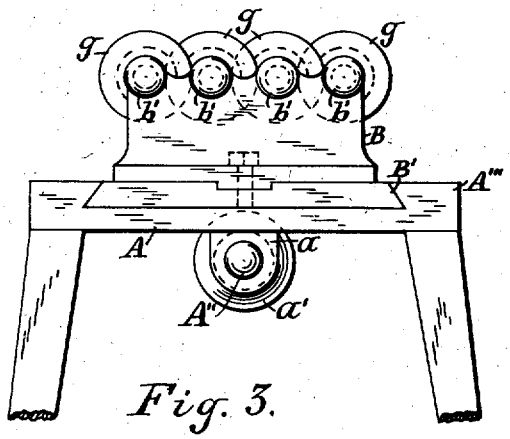
Figure 4:
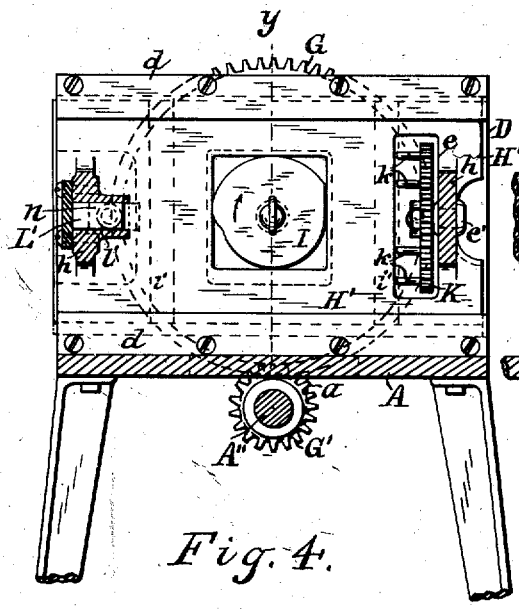
Figure 5:
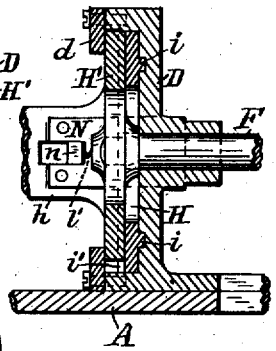
Figure 6:
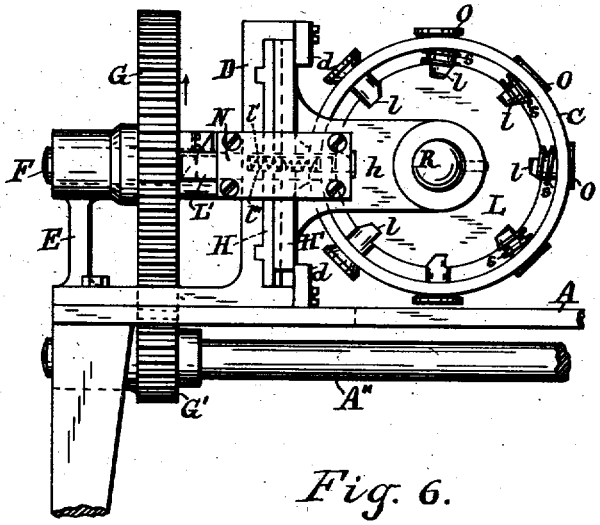
Figure 7:
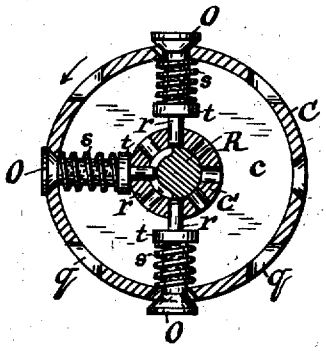
Figure 8:
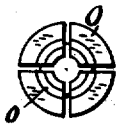
Figure 9:
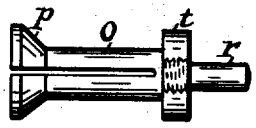

In the drawings hereto annexed and forming a part of this specification, Figure 1 is a side elevation of my improved drilling-machine. Fig. 2 is a top plan view of the same with the button-feeding table removed. Fig. 3 is an end view of the end of the machine carrying the drill-spindles. Fig. 4 is a vertical transverse sectional view taken on line *x x* of Fig. 2. Fig. 5 is a central sectional view of the sliding plates, taken on line *y* of Fig. 4. Fig. 6 is a side elevation of a portion of the machine and shows the locking devices in connection with the drum. Fig. 7 is a transverse sectional view of the button-carrying drum with several button-holding chucks removed; and Figs. 8 and 9 show an end and side view, respectively, of a button-chuck removed from the drum.

Referring specifically to the drawings, A is the table, provided with legs of sufficient length to raise the same to allow the free rotation of the driving-pulley A′, secured upon one end of a shaft A″, turning in a pair of bearings *a a* below the table and at opposite ends.

Although the machine may have only a single drill-spindle and corresponding parts, I have shown and prefer to employ a gang of four drill-spindles *b b*, &c., arranged side by side in a horizontal position and in the same horizontal plane. These drill-spindles turn in bearings *b′ b′*, &c., upon a bracket B, which has its adjustable base B′ lying in a dovetailed groove formed in the elevated end portion A‴ of the table. The said groove extends longitudinally of the table and permits the bracket B, together with its base B′, drill-spindles, and their chucks, to be reciprocated toward and from the button-carrying drum C. The base is reciprocated by means of a cam-wheel *a′* on the shaft A″ below the base and a projection *a″*, extending downward from the lower side of the base through a slot in the table and entering the irregular groove in the said cam-wheel. Four drill-spindles are shown, each being provided with a drill-chuck *b″* of the usual and well-known form on its inner end and a small pulley *g* for a belt intermediate its length between the bearings. The outer bearings for the spindles have their outer ends closed, and three of the spindles are provided with collars *g′* to prevent endwise movement of the spindles within their bearings. The bracket can be moved back on the base B′ from the drum C sufficiently to remove and insert the drills. On the opposite end of the table is secured a bracket having a pair of upwardly-extending parts D and E, each provided with a bearing for a short shaft F, which is directly above and parallel with the shaft A″. On the shaft F, between the said bearings, is a cog-wheel G, which is driven by a pinion G′ on the shaft A″. The part D extends upwardly and horizontally at its base and upper end toward the center of the table to hold and form a guide for a pair of rectangular plates H and H′. The plates are retained in said guide by strips *d d*, secured by screws to the horizontal portions of the guide. The plate H has a pair of ribs *i* on its right-hand surface entering horizontal grooves in the inner side of the guide D and is thereby adapted to slide horizontally or transversely of the machine. The opposite surface of said plate is provided with a pair of vertical ribs $i'$, entering corresponding grooves on the surface of the plate H', and the latter plate is thereby adapted to slide vertically on the plate H in the guide. From this it will be apparent that the plate H' is movable vertically and horizontally and is capable of universal movement in a vertical transverse plane or in a plane at right angles to the axis of the shaft F. In order to effect this movement of the plate H', I provide the inner end of the shaft F with a cam I, which revolves with the shaft in a square or suitably-shaped aperture I' in the center of the plate, as clearly illustrated in Figs. 4 and 5 of the drawings. Fig. 4 shows the plate H' raised and carried to the left by the cam—the position it would occupy during the drilling of the lower right-hand holes of the buttons. It will be obvious that as the cam revolves in the direction of the unfeathered arrow the plate will be moved to carry the buttons or button-holding drum C to the four positions required for drilling the holes in the buttons successively. Shaft A'' makes four revolutions to one of shaft F.

The button-holding drum C is hollow and has a central web $c$ integral with its hub $c'$, which is mounted to turn on a fixed spindle, having its opposite ends secured in brackets $h$ $h$, integral with and projecting outwardly from the surface of the sliding plate H'. Secured rigidly upon the front end of the hub $c'$ is a spur-gear J, which is in mesh with a spur-gear K of the same size, pivoted to and within a slot $e$ in the plate H'. The thickness of the plate is made greater at this point, and a short bolt $e'$ serves as a pivot for the spur-gear K. The inner face of the spur-gear K is provided with eight pins $k$ equal distances apart and near its periphery, and these pins are engaged by an arm $k'$, secured upon the inner side of the cog-wheel G. By this means the button-carrying drum is moved one-eighth of a revolution at each complete revolution of the cog-wheel G. The said arm $k'$ engages the pins successively and revolves the drum periodically between each drilling operation in the direction of the unfeathered arrow on the drum when the drills are removed from the buttons W in the drill-chucks. The locking devices for the drum consist of a disk L, rigidly secured on the rear end of the hub $c'$ and provided with eight notches $l$ $l$, &c., in its periphery equally spaced apart, and a sliding bolt or bar L', having horizontal extensions at its ends to engage the said notches in the disk and a cam-shaped finger $f$, secured upon the inner side of the cog-wheel G. The bolt L' is adapted to slide longitudinally in a capped guide-way N, formed on the rear edge of the plate H', and said bolt is forced toward the notched disk and within the notches $l$ by a coil-spring $l'$, held in a socket $l''$ in said plate and bearing upon one side of the horizontal projection $n$ on the bolt L', that enters the notches. Said bolt L' is drawn out of a notch once during each complete revolution of the cog-wheel G by means of the finger $f$, having the beveled or inclined surface engaging the beveled or inclined surface on the horizontal extension $f'$ of the bolt. The arm $k'$ and finger $f$ are so arranged upon the cog-wheel with relation to the pins $k$ and bolt L' that the bolt is withdrawn just before the arm $k'$ strikes a pin, and the bolt is held out a sufficient time to permit the drum and notched disk to be revolved slightly before the bolt is released. When the bolt is released, the extension $n$ rides on the periphery of the disk until it has turned sufficiently to bring another notch in place opposite the said extension, when the latter is forced in by the spring $l'$. The said drum C (shown in the drawings) carries thirty-two button-holding chucks O, there being eight rows of chucks extending longitudinally of the drum, the rows being equal distances apart and four chucks in each row, the number depending upon the number of drills in the gang. The chucks are each cylindrical in form, with an enlarged outer end provided with a circular cavity $o$ to contain the button and a beveled or conical surface $p$ to engage the beveled surface of the aperture $q$ in the rim of the drum. The chucks are each divided into four parts, which parts diverge when the chucks are forced outward, thus releasing the button and allowing it to drop out when the drum is turned, so that the chuck assumes a vertical and inverted position. The buttons—four at a time—drop through an aperture P in the table into the receptacle X below it. The inner ends of the chucks are provided with short spindles $r$, which pass through the hub $c'$ and engage the stationary cam-shaped spindle R, upon which the hub is rotated. The shape of this spindle is such that the chucks are forced inward by their springs $s$ while they are carried by the drum on the side turned toward the drills. The stationary spindle R is recessed on said side, which allows the spindle $r$ on the chucks to move inward until the expanded inner portion $t$ of the chuck, between which and the rim of the drum the spring $s$ lies, nearly makes contact with the hub $c'$, as shown in Fig. 7. As the chucks ascend on the opposite side of the drum the chucks O are forced outward by the spindle R and the outer ends are open and without buttons. When a row of chucks reach a point above the hub where they stand in a vertical position, they are then in position to receive undrilled buttons. The ends of the chucks when in this position are directly below apertures in the button-feeding table T above, which is supported by standards S, extending upward from the brackets $h$. The said table has a central inclined portion $u$, which assists the fingers of the operator when pushing the button-blanks toward the chucks. Two fingers of each hand are employed to push the buttons toward the chucks. The chucks are stationary when the button-blanks are inserted, for it is done while the drills are drilling the buttons in the horizontal chucks.

In order to drill buttons of a larger or smaller diameter, I remove the chucks and insert others having larger or smaller cavities, as required. The spread of the holes is changed by substituting for the cam I shown another cam having a different throw. Although the cams may have a different throw, they will all fit in the same square aperture I′ in the plate H′. In Fig. 2 is shown a counter-shaft M with pulleys thereon connected by belts *m* and *m′* with the drilling-machine for driving the same. The aperture I′ in the plate H′ need not be exactly square; but it is substantially square—for instance, the corners may be curved more or less instead of angular.

I do not desire to be limited to the precise form or construction of my invention, as it will be obvious that the same may be varied without departing from my invention.

Having described my invention, what I claim as new, and desire to secure by Letters Patent, is—

1. In a button-drilling machine, the combination with a rotary reciprocating drill-spindle, of a rotary drum carrying several chucks for holding buttons and having its axis at right angles to the drill-spindle, means to automatically move the said drum vertically and horizontally, means to rotate the drum intermittently, and a locking device to hold the drum stationary during the drilling operation, as set forth.

2. In a button-drilling machine, the combination with a rotary reciprocating drill-spindle, of a rotary carrier for buttons having its axis at right angles to the drill-spindle, means to move the said carrier vertically and horizontally, means to rotate the carrier intermittently when the drills are removed from the buttons, and a locking device on one end of the carrier to hold the same stationary during the drilling operation, as set forth.

3. In a button-drilling machine, the combination with a plurality of reciprocating drill-spindles each carrying a drill-chuck and a pulley, said spindles being arranged side by side parallel with each other and in the same horizontal plane, of a rotary drum carrying several rows of button-holding chucks therein equally spaced apart, the number of chucks in each row corresponding to the number of drill-spindles, the axis of the drum being at right angles to the spindles, means to automatically move the said drum vertically and horizontally, means to rotate the drum intermittently, and a locking device to hold the drum stationary during the drilling operation, as set forth.

4. In a button-drilling machine, the combination with a plurality of reciprocating drill-spindles each carrying a drill-chuck and a pulley, said spindles being arranged side by side parallel with each other and in the same horizontal plane, of a rotary drum carrying several rows of button-holding chucks therein equally spaced apart, the number of chucks in each row corresponding to the number of drill-spindles, the axis of the drum being at right angles to the spindles, a guide, a pair of rectangular plates movable in said guide, one plate being movable in a horizontal direction and the other being movable in both a vertical and a horizontal direction, and having a substantially square aperture therein, a shaft turning in a bearing in the guide, a cam on the end of the shaft within the aperture and engaging the walls thereof to move the latter plate in different directions, means to drive the said shaft, brackets projecting from the plate and supporting the spindle on which the drum revolves, means to rotate the drum intermittently, and a locking device to hold the drum stationary during the drilling operation, as set forth.

5. In a button-drilling machine, the combination with a plurality of reciprocating drill-spindles each carrying a drill-chuck and a pulley, said spindles being arranged side by side parallel with each other and in the same horizontal plane, of a rotary drum carrying several rows of button-holding chucks therein equally spaced apart, the number of chucks in each row corresponding to the number of drill-spindles, the axis of the drum being at right angles to the spindles, a guide, a pair of rectangular plates movable in said guide, one plate being movable in a horizontal direction and the other being movable in both a vertical and a horizontal direction, and having a substantially square aperture therein, a shaft turning in a bearing in the guide, a cam on the end of the shaft within the aperture and engaging the walls thereof to move the latter plate in different directions, a cog-wheel on the said shaft, the table supporting the guide, a driving-shaft turning in bearings on the lower side of the table, a pinion on the driving-shaft in mesh with the gear-wheel, brackets projecting from the plate having the square aperture, and supporting the spindle upon which the drum revolves, means to rotate the drum intermittently, and a locking device to hold the drum stationary during the drilling operation, as set forth.

6. In a button-drilling machine, the combination with a plurality of reciprocating drill-spindles each carrying a drill-chuck and a pulley, said spindles being arranged side by side parallel with each other and in the same horizontal plane, of a rotary drum carrying several rows of button-holding chucks therein equally spaced apart, the number of chucks in each row corresponding to the number of drill-spindles, the axis of the drum being at right angles to the spindles, a guide, a pair of rectangular plates movable in said guide, one plate being movable in a horizontal direction and the other being movable in both a vertical and a horizontal direction, and having a substantially square aperture therein, a shaft turning in a bearing in the guide, a cam on the end of the shaft within the aperture and engaging the walls thereof to move the latter plate in different directions, a cog-wheel on the said shaft, the table supporting the guide, a driving-shaft turning in bearings on the lower side of the table, a pinion on the driving-shaft in mesh with the gear-wheel, brackets projecting from the plate having the square aperture, and supporting the spindle upon which the drum revolves, a spur-gear mounted on the said plate in mesh with another spur-gear rigidly secured on the end of the hub of the drum, pins carried on the spur-gear pivoted to the plate, an arm carried by the said cog-wheel to engage the pins to rotate the drum intermittently, and a locking device to hold the drum stationary during the drilling operation, as set forth.

7. In a button-drilling machine, the combination with a plurality of reciprocating drill-spindles each carrying a drill-chuck and a pulley, said spindles being arranged side by side parallel with each other and in the same horizontal plane, of a rotary drum carrying several rows of button-holding chucks therein equally spaced apart, the number of chucks in each row corresponding to the number of drill-spindles, the axis of the drum being at right angles to the spindles, a guide, a pair of rectangular plates movable in said guide, one plate being movable in a horizontal direction and the other being movable in both a vertical and a horizontal direction, and having a substantially square aperture therein, a shaft turning in a bearing in the guide, a cam on the end of the shaft within the aperture and engaging the walls thereof to move the latter plate in different directions, a cog-wheel on the said shaft, the table supporting the guide, a driving-shaft turning in bearings on the lower side of the table, a pinion on the driving-shaft in mesh with the gear-wheel, brackets projecting from the plate having the square aperture, and supporting the spindle upon which the drum revolves, a spur-gear mounted on the said plate in mesh with another spur-gear rigidly secured on the end of the hub of the drum, pins carried on the spur-gear pivoted to the plate, an arm carried by the said cog-wheel to engage the pins to rotate the drum intermittently, a disk carried by the hub of the said drum having notches in its periphery corresponding in number to the rows of button-chucks carried by the drum, a bolt held in a guideway in one edge of the movable plate, to enter the notches in the disk, a spring to force the bolt toward the disk and a cam-faced finger carried by the said cog-wheel to engage a projection of the bolt to withdraw the latter from the notches, as set forth.

8. In a button-drilling machine, the combination with a plurality of reciprocating drill-spindles each carrying a drill-chuck and a pulley, said spindles being arranged side by side parallel with each other and in the same horizontal plane, of a rotary drum carrying several rows of button-holding chucks therein equally spaced apart, the number of chucks in each row corresponding to the number of drill-spindles, the axis of the drum being at right angles to the spindles, means to automatically move the said drum vertically and horizontally, means to rotate the drum intermittently, a disk carried by the hub of the said drum having notches in its periphery corresponding in number to the rows of button-chucks carried by the drum, a bolt held in a guideway in one edge of the movable plate, to enter the notches in the disk, a spring to force the bolt toward the disk and a cam-faced finger carried by the said cog-wheel to engage a projection of the bolt to withdraw the latter from the notches, as set forth.

9. In a button-drilling machine, the combination with a table, a movable part carrying bearings for spindles, spindles in the bearings arranged side by side parallel with each other with their axis in a horizontal plane, the driving-shaft below the table parallel with the spindles, of a cam-wheel on the driving-shaft, a downwardly-extending projection on the movable part extending through the table and engaging the cam-wheel, a rotary drum carrying several rows of button-holding chucks therein equally spaced apart, the number of chucks in each row corresponding to the number of drill-spindles, the axis of the drum being at right angles to the spindles, means to automatically move the said drum vertically and horizontally, means to rotate the drum intermittently, and a locking device to hold the drum stationary during the drilling operation, as set forth.

10. In a button-drilling machine, the combination with a rotary reciprocating drill-spindle, of a rotary drum carrying several expansible chucks for holding buttons and having its axis at right angles to the drill-spindle, means to automatically move the said drum vertically and horizontally, means to rotate the drum intermittently, and means to expand and contract the chucks successively during the revolution of the said drum, substantially as described and shown.

11. In a button-drilling machine, the combination with a rotary drill-spindle, of a rotary drum carrying several expansible chucks for holding buttons, means to rotate the drum intermittently, and a stationary recessed shaft for the drum, and springs to automatically expand and contract the chucks successively during the revolution of the said drum, as set forth.

12. In a button-drilling machine, the combination with a rotary reciprocating drill-spindle, of a rotary drum carrying a plurality of button-holding chucks distributed equal distances apart in the rim of the drum and having its axis at right angles to the drill-spindle, a stationary spindle having a recess on one side for the said drum to turn on, said chucks being each divided at its outer end and provided with a conical surface to engage its beveled aperture in the rim and engaging with its inner end the said stationary spindle, and a spring to cause the inner end to enter the said recess when the recess is opposite to contract the chuck, as set forth.

13. In a button-drilling machine, the combination with a plurality of reciprocating drill-spindles each carrying a drill-chuck and a pulley, said spindles being arranged side by side parallel with each other and in the same horizontal plane, of a rotary drum carrying several rows of expansible reciprocating button-holding chucks therein equally spaced apart around the rim and radiating from its axis, the number of chucks in each row corresponding to the number of drill-spindles, the axis of the drum being at right angles to the spindles, a guide, a pair of rectangular plates movable in said guide, one plate being movable in a horizontal direction and the other being movable in both a vertical and a horizontal direction, and having a substantially square aperture therein, a shaft turning in a bearing in the guide, a cam on the end of the shaft within the aperture and engaging the walls thereof to move the latter plate in different directions, means to drive the said shaft, brackets projecting from the plate, a spindle having its ends fixed in said brackets for the said drum to turn on, said spindle having its side opposite the drills recessed to receive the inner ends of the said button-chucks, springs to reciprocate the chucks, means to rotate the drum intermittently, and a locking device to hold the drum stationary during each drilling operation, as set forth.

14. In a button-drilling machine, the combination with a rotary drill-spindle, of a rotary drum carrying a plurality of button-holding chucks adapted to open and close distributed equal distances apart in the rim of the drum and having its axis at right angles to the drill-spindle, a table above the said drum for feeding the button-blanks to the chucks, means for opening the chucks when opposite the table to receive the button-blanks, close said chucks to hold the blanks during the drilling operation and open said chucks to release the drilled buttons, substantially as described and shown.

In testimony whereof I have hereunto signed my name.

SAMUEL P. MACCORDY.

Witnesses:

EDWARD P. WHITE,
LEONARD WELDON.